US008044992B2

(12) United States Patent
Kurebayashi et al.

(10) Patent No.: US 8,044,992 B2
(45) Date of Patent: Oct. 25, 2011

(54) MONITOR FOR MONITORING A PANORAMIC IMAGE

(75) Inventors: Masaaki Kurebayashi, Shizuoka (JP); Mikiko Mase, Aichi (JP); Hiroyuki Hasegawa, Tokyo (JP); Hideki Hama, Tokyo (JP)

(73) Assignee: Sony Corporation, Tokyo (JP)

( * ) Notice: Subject to any disclaimer, the term of this patent is extended or adjusted under 35 U.S.C. 154(b) by 894 days.

(21) Appl. No.: 11/009,233

(22) Filed: Dec. 10, 2004

(65) Prior Publication Data
US 2005/0157173 A1 Jul. 21, 2005

(30) Foreign Application Priority Data

Dec. 12, 2003 (JP) .................................. 2003-415744

(51) Int. Cl.
*H04N 7/00* (2011.01)
*H04N 5/232* (2006.01)
(52) U.S. Cl. ........................................ 348/36; 348/211.8
(58) Field of Classification Search .................. 348/352, 348/145, 208.1, 211.8, 207.11, 333.02
See application file for complete search history.

(56) References Cited

U.S. PATENT DOCUMENTS

| 5,528,290 | A | * | 6/1996 | Saund | 348/218.1 |
| 6,078,701 | A | * | 6/2000 | Hsu et al. | 382/294 |
| 6,304,284 | B1 | * | 10/2001 | Dunton et al. | 348/36 |
| 6,462,773 | B1 | * | 10/2002 | Koga | 348/143 |
| 6,552,744 | B2 | * | 4/2003 | Chen | 348/218.1 |
| 6,839,067 | B2 | * | 1/2005 | Liu et al. | 345/647 |
| 6,930,703 | B1 | * | 8/2005 | Hubel et al. | 348/37 |
| 6,934,332 | B1 | * | 8/2005 | Auyeung et al. | 375/240.16 |
| 7,092,012 | B2 | * | 8/2006 | Nakamura et al. | 348/211.3 |
| 7,095,786 | B1 | * | 8/2006 | Schonfeld et al. | 375/240.16 |
| 7,292,261 | B1 | * | 11/2007 | Teo | 348/36 |
| 7,456,864 | B2 | * | 11/2008 | Soga | 348/218.1 |
| 2002/0024599 | A1 | * | 2/2002 | Fukuhara et al. | 348/169 |
| 2003/0117488 | A1 | * | 6/2003 | Pierce et al. | 348/48 |
| 2004/0017386 | A1 | * | 1/2004 | Liu et al. | 345/647 |
| 2004/0017470 | A1 | * | 1/2004 | Hama et al. | 348/42 |
| 2004/0119819 | A1 | * | 6/2004 | Aggarwal et al. | 348/143 |
| 2005/0099494 | A1 | * | 5/2005 | Deng et al. | 348/36 |
| 2005/0200714 | A1 | * | 9/2005 | Marchese | 348/211.3 |
| 2007/0091124 | A1 | * | 4/2007 | Hasegawa et al. | 345/629 |

FOREIGN PATENT DOCUMENTS

| JP | 2000-50235 | | 2/2000 |
| JP | 2002-288663 | * | 10/2002 |
| JP | 2003-324719 | | 11/2003 |
| JP | 2003-333390 | * | 11/2003 |

* cited by examiner

*Primary Examiner* — Hung Lam
(74) *Attorney, Agent, or Firm* — Frommer Lawrence & Haug LLP; William S. Frommer; Thomas F. Presson

(57) ABSTRACT

A system and method to monitor a target area of a panoramic images by shooting the target area, sequentially shifting the shooting direction. A unit image of a generated panoramic image and a corresponding unit image of another panoramic image generated before the first panoramic image are compared and the change, if any, in the luminance level is detected. Then, the detected difference of luminance level is compared with a predetermined threshold value and predetermined information is displayed on the display screen with the generated panoramic image. It is possible to define small regions in the area for which a large threshold is predetermined and/or small regions in the area for which no such comparison is made on a unit image basis.

15 Claims, 15 Drawing Sheets

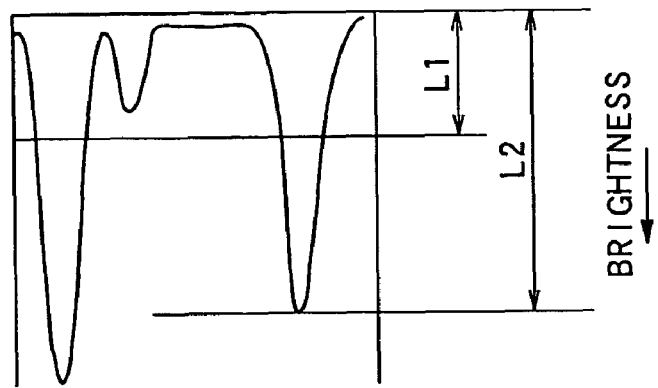
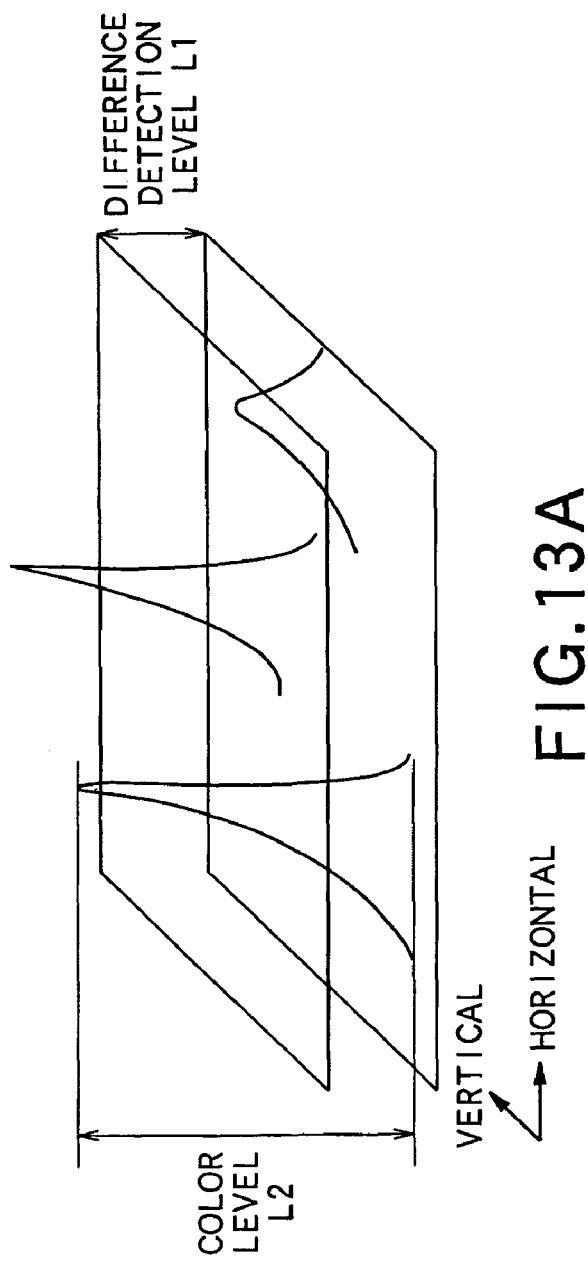
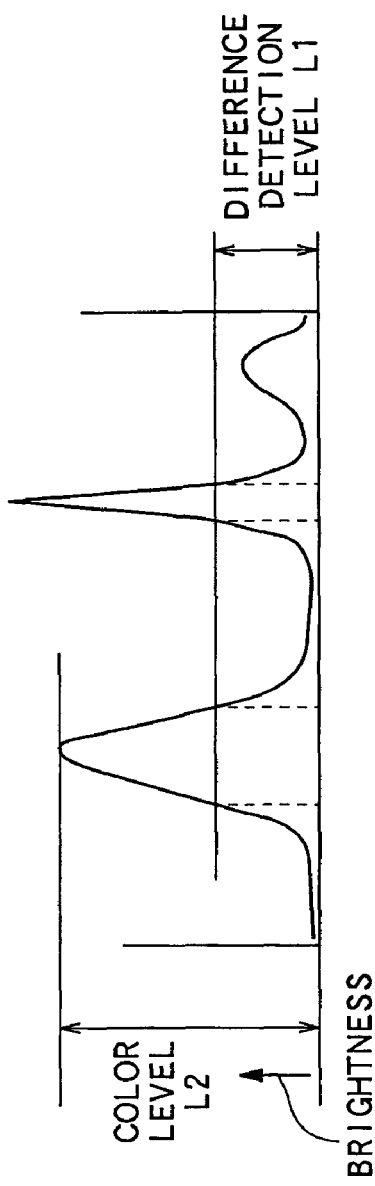
FIG. 13A
FIG. 13B
FIG. 13C

MONITOR FOR MONITORING A PANORAMIC IMAGE

BACKGROUND OF THE INVENTION

1. Field of the Invention

This invention relates to a monitor for monitoring the situation of a broad area by means of a panoramic image obtained by shooting the surroundings, sequentially changing the shooting direction and also to a monitoring method, a computer program and a recording medium to be used with such a monitor.

This application claims priority of Japanese Patent Application No. 2003-415744, filed on Dec. 12, 2003, the entirety of which is incorporated by reference herein.

2. Description of Related Art

Electronic still cameras have been and being popularly used. They are adapted to convert light transmitted through a lens as a result of shooting a target by means of a solid state image pickup element such as CCD into image signals and record the image signals on a recording medium. They can also reproduce the recorded image signals. Many electronic still cameras are equipped with a monitor that can display a picked up still image so that a specific one of the recorded still images may be displayed there. In such an electronic still camera, the image signals supplied to the monitor correspond to an image of the target of shooting. Thus, it is an image of a very limited area that can be displayed at a time. In other words, it has not been possible to monitor the situation of a broad area.

In view of the above identified circumstances, monitoring cameras that can continuously shoot a target, sequentially shifting the shooting direction, to obtain a panoramic view of the target by arranging a plurality of unit images in order to monitor the situation of a broad area have become popular. Particularly, in recent years, techniques of reducing the size of each image and synthetically combining a plurality of images into a single image to produce video signals of a single frame have been proposed (see, inter alia, Patent Document 1: Jpn. Pat. Appln. Laid-Open Publication No. hei 10-108163). Additionally, central monitoring/recording systems adapted to monitor a broad area by collecting images that are obtained by means of a plurality of monitoring video cameras arranged at respective positions have also been proposed (see, inter alia, Patent Document 2: Jpn. Pat. Appln. Laid-Open Publication No. 2000-243062).

When shooting a target area with a predetermined view angle by means of a known monitoring camera as shown in FIG. 1 of the accompanying drawings, it is necessary to sequentially shift the shooting direction both horizontally and vertically. When, for example, the size of the target area is expressed by s×t times of the frame size of each image (to be referred to as unit image) obtained by shooting a small region of the target area from a given view angle, it is necessary to select at least s×t shooting directions.

To be more specific, the target is shot by aligning the shooting direction of the monitoring camera to coordinates (1, 1) of the upper left corner. Then, the shooting direction of the monitoring camera is shifted sequentially and horizontally to coordinates (2, 1), (3, 1), (4, 1), . . . , (s, 1) to shoot the target continuously. After completing the operation of shooting the first row, the target is shot by aligning the shooting direction of the monitoring camera to coordinates (1, 2) of the second row and then shifting the shooting direction sequentially and horizontally. After repeating the above operation until the shooting direction is aligned to coordinates (s, t) for shooting the target, the s×t unit images are put together to synthetically produce an image of the entire target area.

However, when a watchman tries to detect a change in the target area, using the monitored image recorded on a recording medium such as a video tape in a manner as described above, he has to observe every inch of the target area in the monitored image that is updated continuously by each scanning motion of the camera. Particularly, the watchman has to identify any minor change in the image and appearance of a small object at the cost of a large effort and time. Additionally, since such a monitoring system heavily relies on the eyes of the watchman, it inherently involves a risk that changes and appearances of objects can be overlooked.

Still additionally, when a change is detected in the target area, the watchman has to analyze the situation and the cause of the change in detail by referring to the image data recorded in the past to further raise the load on the part of the watchman.

Furthermore, in a system where any difference of luminance between panoramic images taken with time intervals calls watchman's attention and the target area is what is shown in FIG. 1, the road leading to the entrance of the church may frequently calls watchman's attention because many people may be walking there and hence movements may be detected also frequently. If the watchman needs to monitor small regions of the target area other than the road where many movements may be detected, he may be constantly annoyed by the movements on the road that may arise on the road because they inevitably call his attention. Then, the watchman can eventually mix up the changes detected on the road and those detected in other small regions of the target area so that he may not be able to reliably monitor the target area.

SUMMARY OF THE INVENTION

Therefore, it is an object of the present invention to dissolve the above identified problems of known monitors of the type under consideration by providing a monitor that can alleviate the load on the part of the watchman and detect any change in a broad target area quickly and accurately, focusing only on a desired small region of the target area, along with a monitoring method, a computer program and a recording medium that can be used with such a monitor.

Thus, according to the invention for dissolving the above identified problems, when a target area is monitored by way of panoramic images of the area that are generated by shooting the target area, sequentially shifting the shooting direction, a unit image of a generated panoramic image and a corresponding unit image of another panoramic image generated before the first panoramic image are compared and the change, if any, in the luminance level is detected. Then, the detected difference of luminance level is compared with a predetermined threshold value and predetermined information is displayed on the display screen along with the generated panoramic image. It is possible to define one or more than one small regions in the area for which a large threshold is predetermined and/or small regions in the area for which no such comparison is made on a unit image basis.

More specifically, in an aspect of the present invention, there is provided a monitor for monitoring a panoramic image generated by shooting a target area, sequentially shifting the shooting direction, the monitor comprising: a comparing means for sequentially detecting the difference of luminance level between each unit image forming the generated panoramic image and the corresponding unit image taken prior to the first unit image along the same shooting direction and comparing the detected difference of luminance level with a predetermined threshold value; a defining means for predefining one or more than one regions with a threshold value greater than the predetermined threshold value and/or one or more than one regions exempt from the comparison, on a unit image basis; and a display control means for causing predetermined information to be displayed on a display screen along with the generated panoramic image according to the result of the comparison by the comparing means.

In another aspect of the invention, there is provided a monitoring method of monitoring a panoramic image generated by shooting a target area, sequentially shifting the shooting direction, the method comprising: a comparing step of sequentially detecting the difference of luminance level between each unit image forming the generated panoramic image and the corresponding unit image taken prior to the first unit image along the same shooting direction and comparing the detected difference of luminance level with a predetermined threshold value; and a display step of causing predetermined information to be displayed on a display screen along with the generated panoramic image according to the result of the comparison by the comparing means; one or more than one regions with a threshold value greater than the predetermined threshold value and/or one or more than one regions exempt from the comparison being predefined on a unit image basis in the comparing step.

In still another aspect of the invention, there is provided a computer program for causing a computer to monitor a panoramic image generated by shooting a target area, sequentially shifting the shooting direction, the program comprising: a comparing step of sequentially detecting the difference of luminance level between each unit image forming the generated panoramic image and the corresponding unit image taken prior to the first unit image along the same shooting direction and comparing the detected difference of luminance level with a predetermined threshold value; and a display step of causing predetermined information to be displayed on a display screen along with the generated panoramic image according to the result of the comparison in the comparing step; one or more than one regions with a threshold value greater than the predetermined threshold value and/or one or more than one regions exempt from the comparison being predefined on a unit image basis in the comparing step.

In a further aspect of the present invention, there is provided a recording medium storing a computer program for causing a computer to monitor a panoramic image generated by shooting a target area, sequentially shifting the shooting direction, the program comprising: a comparing step of sequentially detecting the difference of luminance level between each unit image forming the generated panoramic image and the corresponding unit image taken prior to the first unit image along the same shooting direction and comparing the detected difference of luminance level with a predetermined threshold value; and a display step of causing predetermined information to be displayed on a display screen along with the generated panoramic image according to the result of the comparison in the comparing step; one or more than one regions with a threshold value greater than the predetermined threshold value and/or one or more than one regions exempt from the comparison being predefined on a unit image basis in the comparing step.

Thus, according to the invention, when a target area is monitored by way of panoramic images of the area that are generated by shooting the target area, sequentially shifting the shooting direction, a unit image of a generated panoramic image and a corresponding unit image of another panoramic image generated before the first panoramic image are compared and the change, if any, in the luminance level is detected. Then, the detected difference of luminance level is compared with a predetermined threshold value and predetermined information is displayed on the display screen along with the generated panoramic image. It is possible to define one or more than one small regions in the area for which a large threshold is predetermined and/or small regions in the area for which no such comparison is made on a unit image basis.

With the above-described arrangement, watchman's attention is no longer called unnecessarily and frequently and the watchman can focus on the small regions of the area where any movement has to be detected to raise the efficiency and the accuracy of the monitoring operation.

BRIEF DESCRIPTION OF THE DRAWINGS

FIG. 13 is a schematic illustration of a technique of defining a color level and a difference detection level for each primary color.

DETAILED DESCRIPTION OF THE PREFERRED EMBODIMENTS

Figure 1:
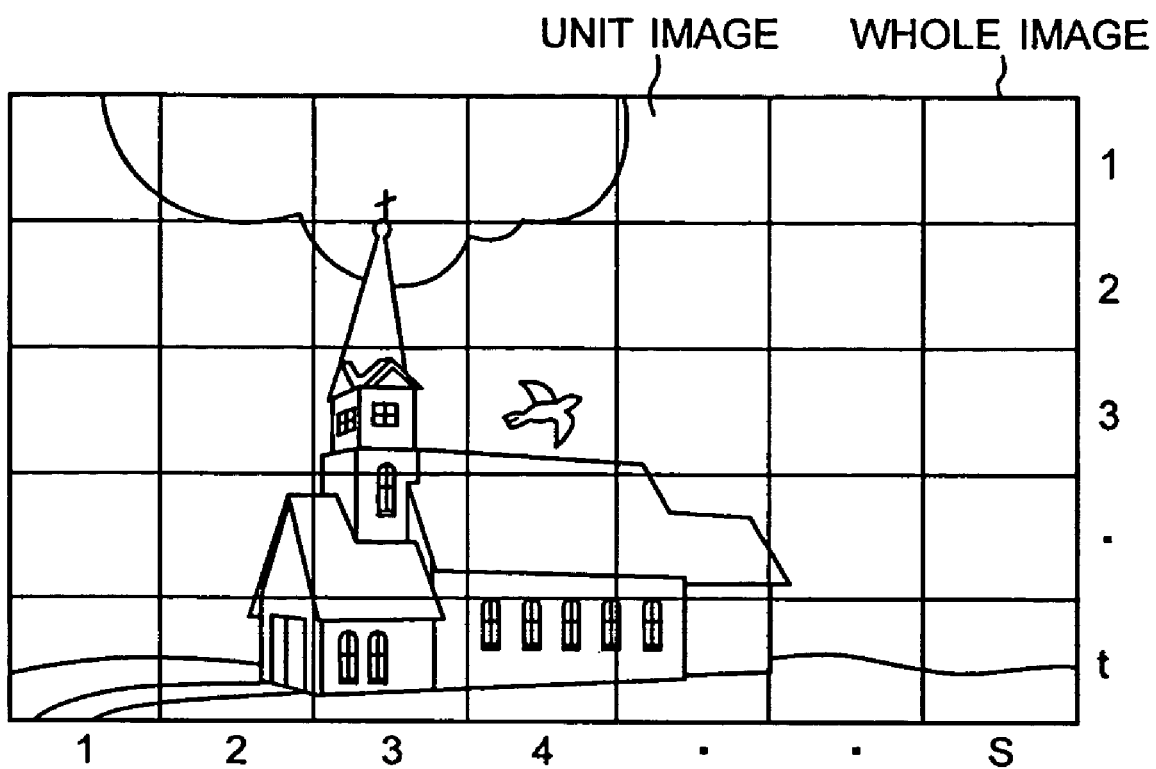
FIG. 1 is a picked up panoramic whole image.
Figure 2:
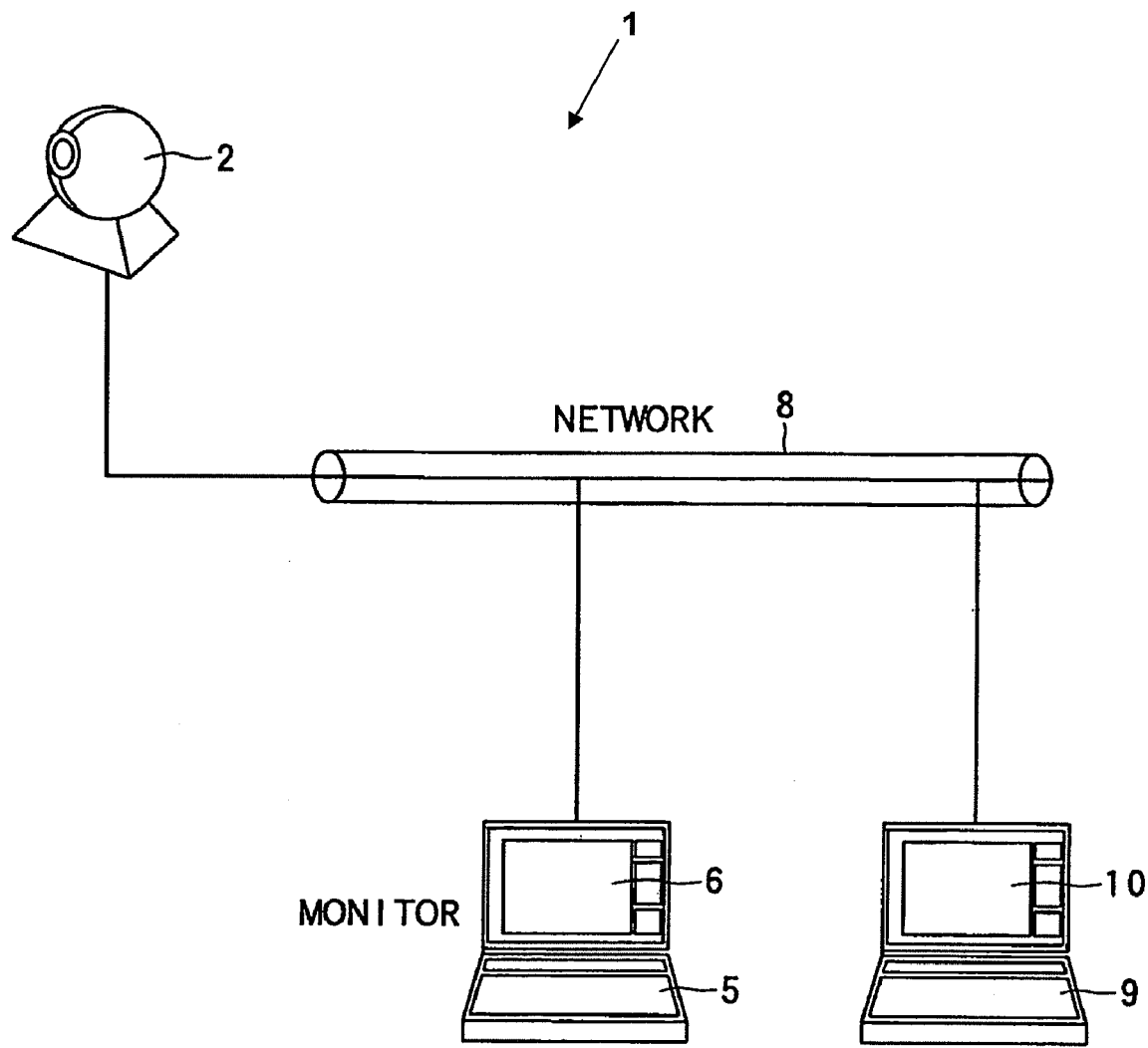
FIG. 2 is a schematic illustration of a monitoring system realized by applying the present invention.

Now, the present invention will be described in greater detail by referring to the accompanying drawings that illustrate preferred embodiments of the invention. Firstly, referring to FIG. 2 that schematically illustrates a monitoring system realized by applying the present invention, the monitoring system 1 comprises a camera unit 2 for shooting a target and generating image signals, a monitor 5 to which the image signals are transmitted, a display 6 connected to the monitor 5, a terminal unit 9 where a plurality of users execute application programs, a terminal display 10 connected to the terminal unit 9 and a network 8 for realizing bidirectional communications between the camera unit 2 and the monitor 5 and between the camera unit 2 and the terminal unit 9.

Figure 3:
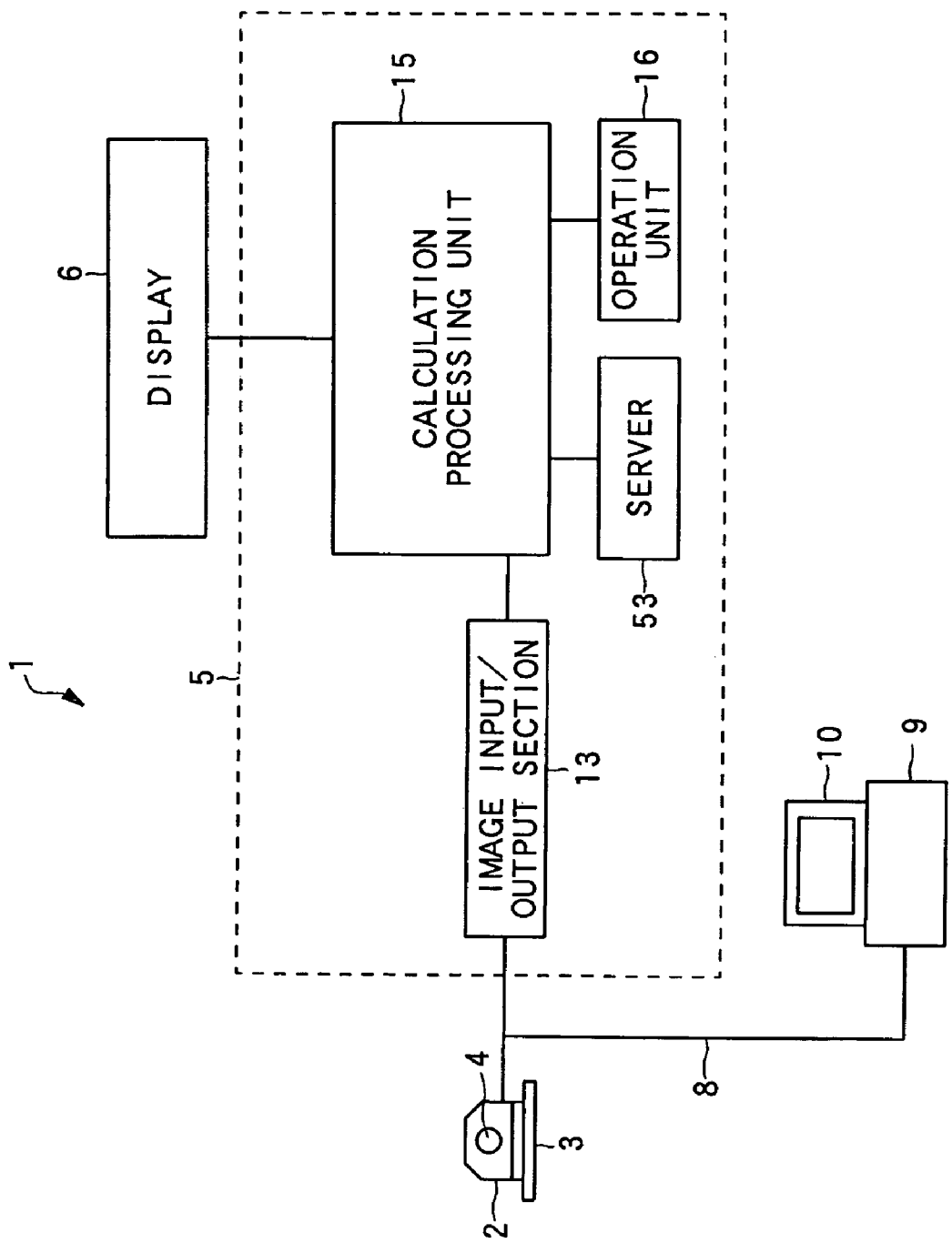
FIG. 3 is a schematic block diagram of a monitoring system realized by applying the present invention, showing the configuration thereof.

The camera unit 2 of this monitoring system 1 by turn comprises a pan-tilter section 3 and a camera section 4 as integral components thereof as shown in FIG. 3. The pan-tilter section 3 is a rotary table for freely changing the shooting direction along, for example, two axes of a panning axis and a tilting axis.

The camera section 4 is mounted on the rotary table of the pan-tilter section 3 and adapted to shoot a target of imaging under the control of the monitor 5, adjusting its shooting direction horizontally and/or vertically. Additionally, the camera section 4 increases or decreases the shooting magnification when shooting the target under the control of the monitor 5, while sequentially shifting the shooting direction. It is possible to acquire multilateral image information by arranging a plurality of such camera sections 4 for a single monitor 5 and shooting the same target from different shooting angles.

Referring to FIG. 3, the monitor 5 comprises an image input/output section 13 for conducting a predetermined processing operation on the image signals transmitted from the camera unit 2, a processing section 15 connected to the image input/output section 13 to generate a moving image according to the image signals, a server 53 connected to the processing section 15 to record the image signals and an operation section 16 to be used by the user to control the monitor 5.

The monitor 5 is typically constituted by an electronic device such as personal computer (PC) and adapted to record the image signals transmitted from the camera unit 2 and display images on the display 6 for the user according to the recorded image signals. Additionally, when the user specifies a desired image region or a desired image position, the monitor 5 controls the operation of selecting an image that optimally meet the specification from the recorded image signals and displays it. Thus, the monitor 5 takes the role of central processing unit that controls the entire network 8 and transmits images in response to a request from some other terminal unit 9. The monitor 5 will be described in greater detail hereinafter.

The network 8 is a public communication network to which the monitor 5 is connected by way of a telephone line and which allows bidirectional transmission/reception of information such as the Internet or an ISDN (integrated services digital network)/B (broadband)–ISDN. If the monitoring system 1 is operated in a small area, the network 8 may be a LAN (local area network). Additionally, the network 8 may be adapted to transmit MPEG images in addition to still images. If such is the case, based on the Internet Protocol (IP) MPEG data will be transmitted continuously by way of a channel, while still image data will be transmitted periodically by way of another channel.

The terminal unit 9 is a PC by means of which the user who may be at home or in the office acquires images from the monitor 5 by way of the network 8 and execute desired processing operations. When a plurality of terminal units 9 are connected to the network 8, the application program of the monitoring system 1 can be provided to the plurality of users simultaneously. The terminal unit 9 displays the images acquired form the monitor 5 on the terminal display 10. Additionally, the terminal unit 9 generates a request signal according to an instruction-giving operation of the user and transmits it to the monitor 5. Since the configuration of the terminal unit 9 is similar to that of the monitor 5, which will be described hereinafter, and hence will not be described here any further.

Now, the camera unit 2 and the monitor 5 of the monitoring system 1 realized by applying the present invention will be described below in detail.

Figure 4:
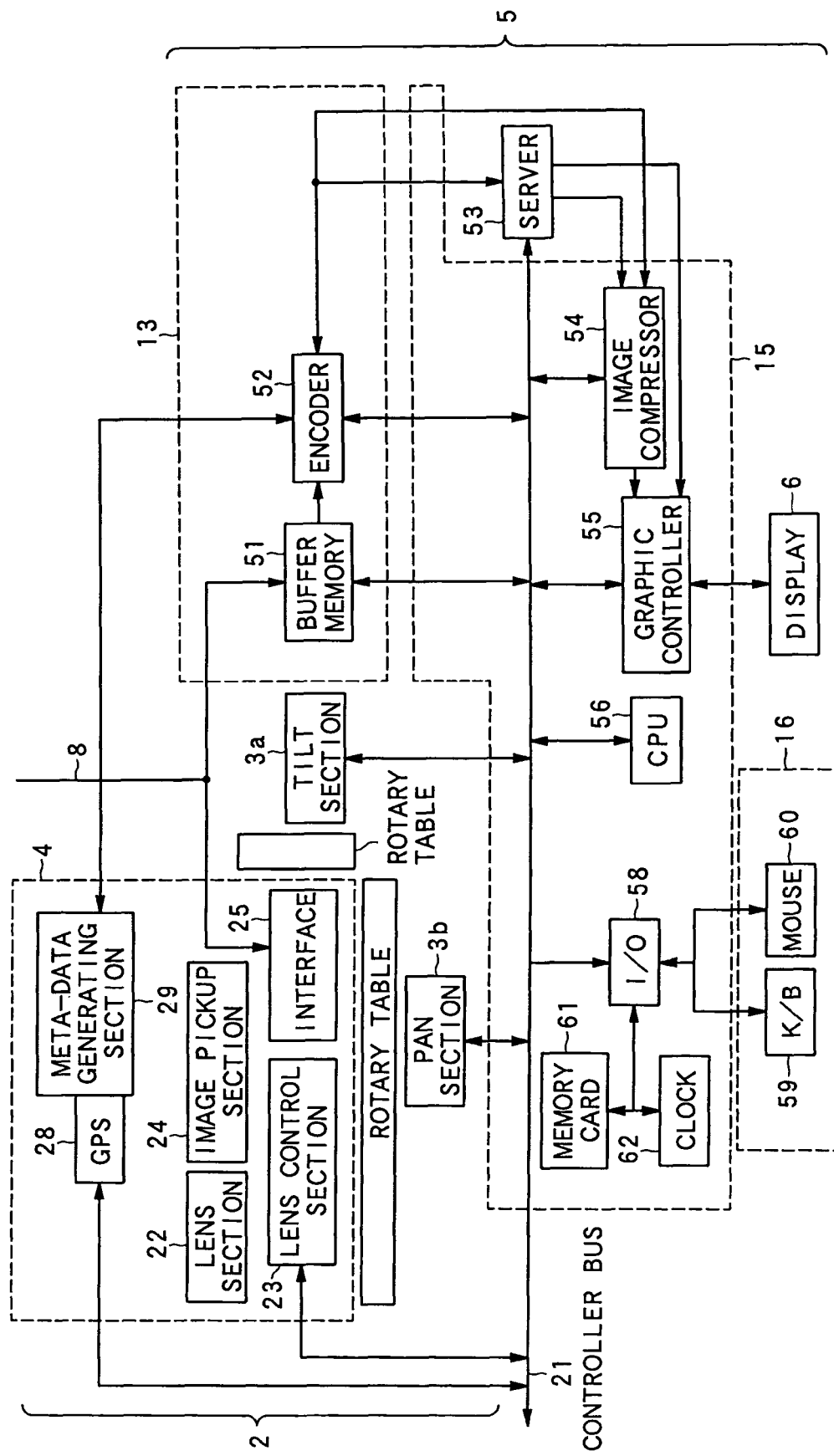
FIG. 4 is a schematic block diagram of a camera unit and a monitor according to the invention.

FIG. 4 illustrates the configuration of the camera unit 2 and that of the monitor 5 in detail. In FIG. 3, the components of the camera unit 4 and those of the monitor 5 are connected to a common controller bus 21.

The pan-tilter section 3 of the camera unit 2 includes a tilt section 3a and a pan section 3b for controlling the rotary table in order to change the shooting direction. The camera section 4 of the camera unit 2 includes a lens control section 23 for mainly changing the view angle of the lens section 22, an image pickup section 24 arranged at a position perpendicularly intersecting the optical axis of the lens section 22, an IEEE1394 (Institute of Electrical and Electronics Engineers) 1394 interface 25 for transmitting the image signals generated by the image pickup section 24 to the image input/output section 13, a GPS (global positioning system) receiving section 28 for detecting the current position of the camera unit 2 and a meta-data generating section 29 fitted to the GPS receiving section 28. Note that the IEEE1394 interface 25 may be replaced by Ethernet®.

The image input/output section 13 has a buffer memory 51 that is connected to the IEEE1394 interface 25 and an encoder 52 that is connected to the buffer memory 51.

The processing section 15 has to an image compressing section 54 for compressing the images read out from the server 53, a graphic controller 55 connected to the server 53 and the image compressing section 54 to generate images to be displayed on the display 6, a CPU 56 for controlling the other sections of the camera unit 2 by way of the controller bus 21 and a memory card 61 and a clock 62 that are connected to I/O port 58.

The operation section 16 has a keyboard 59 and a mouse 60 to be used by the user to specify a desired image region and a desired image position in the image being display on the display 6.

The tilt section 3a and the pan section 3b drive the stepping motor that operates as the drive source of the rotary table according to the drive signal from the CPU 56. As a result, the shooting direction of the camera section 4 mounted on the rotary table can be changed horizontally and/or vertically.

The lens control section 23 performs an automatic aperture control operation and an automatic focus control operation on the lens section 22 according to the drive signal from the CPU 56. Additionally, the lens control section 23 changes the shooting direction relative to the target according to the drive signal. As a result, the camera section 4 can sequentially regulate the magnification when shooting the target.

The image pickup section 24 comprises a solid state image pickup element, which may typically be a CCD (charge coupled device), and is adapted to form an image of the target on the imaging plane of the image pickup element by focusing rays of light coming in through the lens section 22, generate image signals by photoelectric conversion and transmit the generated video signals to the IEEE1394 interface 25.

The GPS receiving section 28 detects the position and the shooting direction of the camera unit 2 according to the signal transmitted from the GPS system. Due to the provision of the GPS receiving section 28, particularly when a plurality of camera units 2 are arranged, it is possible to interlock the shooting directions of the camera units 2 in a controlled manner. The output signal of the GPS receiving section 28 is supplied to the meta-data generating section 29, which generates positional information including the latitude, the longitude, the azimuth and the altitude of the camera unit 2 and meta-data including the current clock time and various parameters. The meta-data generating section 29 supplies the positional information and the meta-data it generates to the encoder 52. For the purpose of the present invention, the GPS receiving section 28 and the meta-data generating section 29 may be omitted.

The buffer memory 51 temporarily stores the image signals supplied from the IEEE1394 interface 25 according to the control signal from the CPU 56. The video signals that are temporarily stored in the buffer memory 51 are then supplied to the encoder 52 and subjected to compression/coding according to the applicable standard such as the JPEG (Joint Photographic Experts Group) Standard. Note that the encoder 52 may add the positional information and the meta-data to the image signals to be compressed/coded that are supplied from the meta-data generating section 29. The encoder 52 outputs the compressed/coded image signals to the server 53 or the image compressing section 54. When the supplied image signals are not subjected compression/coding, the operation of the encoder 52 will be omitted.

The server 53 sequentially records the image signals output from the encoder 52 after correlating them with the positional information and the meta-data. Note that the server 53 may be replaced by a hard disc or a disc-shaped recording medium that can removably fitted to the camera unit 2. The image signals recorded in the server 53 are read to the image compressing section 54 and the graphic controller 55 under the control of the CPU 56. If the image signals recorded in the server 53 are also recorded on the memory card 61 under control, the user can transfer the images he or she has picked up to some other PC. If the image signals recorded in the server 53 are recorded in a network server (not shown) under control, the server 53 may be replaced by the network server (not shown).

The image compressing section 54 generates compressed images or thumbnail images for the video signals in the JPEG format that are read out from the server 53. The image compressing section 54 also reads out the images recorded in the server 53 and generates a moving image under the control of the CPU 56. The technique according to the MPEG, Motion-JPEG or Motion-JPEG2000 may be used as compression technique when generating such a moving image.

The graphic controller 55 performs an image processing operation for generating the image to be displayed on the display 6 according to the image signals read out from the server 53 or the image signals output from the image compressing section 54. The graphic controller 55 also controls the contrast and the luminance of the image being displayed on the display 6 under the control of the CPU 56.

When the user specifies an image region and an image position by way of the keyboard 59 and/or the mouse 60, the CPU 56 transmits a drive signal for driving the pan-tilter section 3 and the lens control section 23 and a control signal for controlling the component sections of the monitor 5 by way of the controller bus 21. Additionally, when the CPU 56 receives a predetermined request signal from the terminal unit 9, it controls the operation of the camera unit 2 so as to select an optimal still image, an optimal moving image or an optimal piece of information recorded in the server 53 and transmit it to the terminal unit 9.

Now, the shooting operation of the monitoring system 1 realized by applying the present invention will be described below.

Figure 5:
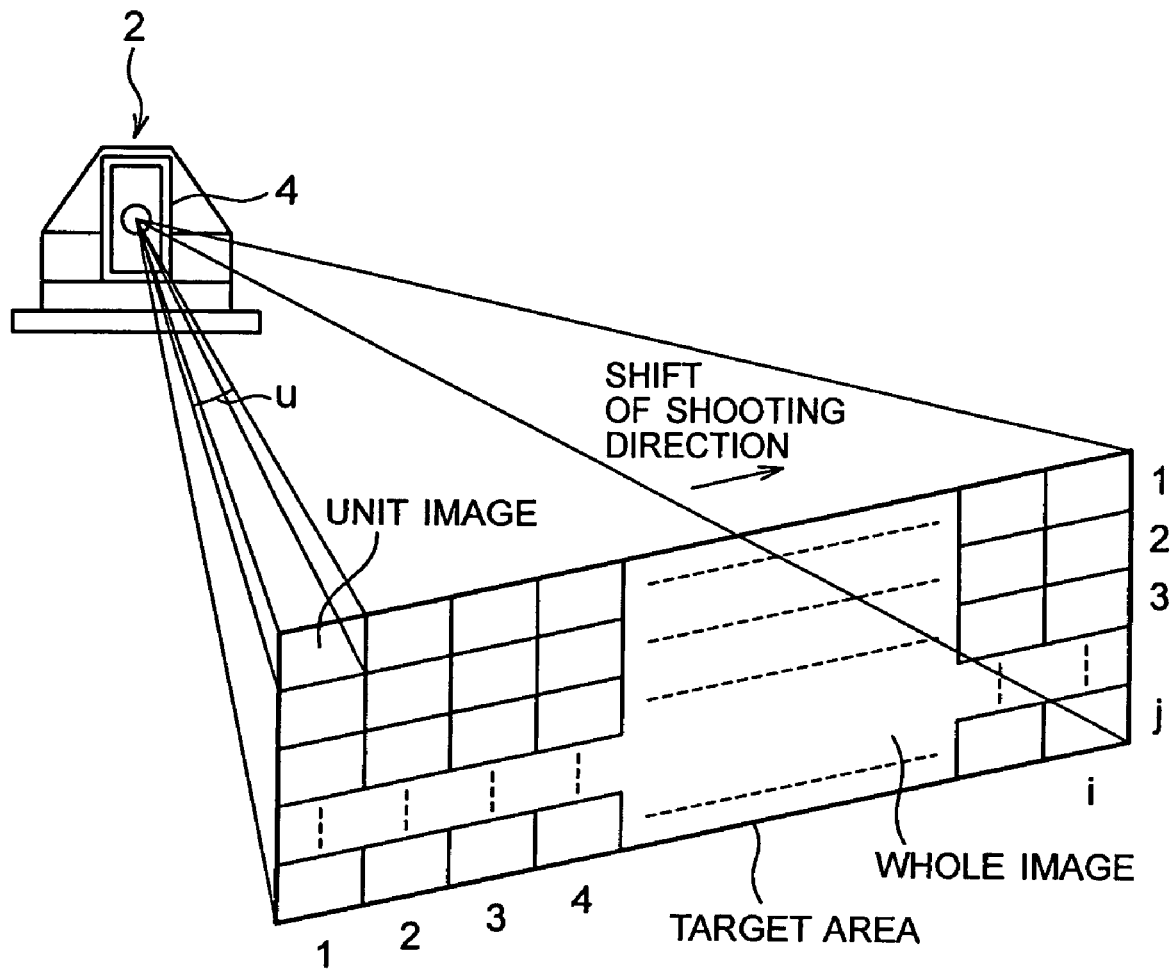
FIG. 5 is a schematic illustration of an operation of a camera unit of shooting a target area defined by a black frame with a view angle u.

FIG. 5 is a schematic illustration of an operation of a camera unit 2 of shooting a target area defined by a black frame with a view angle u. The shooting direction needs to be sequentially shifted both horizontally and vertically in order to shoot the entire target area with a view angle u. If the size of the entire target area is i×j times of the frame size of the image (to be referred to as unit image hereinafter) obtained by shooting the target with a view angle u, it is necessary to select at least i×j shooting directions. An image of the entire target area can be synthetically obtained by putting the i×j unit images obtained by shooting the target with the view angle u together.

If the coordinates (M, N) of the unit images of the target area take values of 1, 2, . . . , M, . . . , i from the left to right in the horizontal direction and 1, 2, . . . , N, . . . , j from top to down in the vertical direction, the CPU 56 firstly transmits a drive signal to the tilt section 3a and the pan section 3b to drive the camera section 4 so as to align the shooting direction to coordinates (1, 1) and shoot the target. The image signal of the unit image obtained by shooting the target with a shooting direction aligned to coordinates (1, 1) is temporarily stored in the buffer memory 51 and compressed and coded by the encoder 52 according to the JPEG Standard. Then, the positional information showing the shooting direction and the meta-data transmitted from the GPS 28 are added to the image signal and recorded in the server 53.

Similarly, the CPU 56 transmits a drive signal to the tilt section 3a and the pan section 3b to drive the camera section 4 so as to shift the shooting direction by an image frame, align it to coordinates (2, 1) and shoot the target. The image signal of the unit image obtained by shooting the target with a shooting direction aligned to coordinates (2, 1) is also recorded in the server 53. In this way, the camera section 4 sequentially shifts the shooting direction horizontally to coordinates (3, 1), (4, 1), . . . , (i, 1) and shoots the target under the control of the CPU 56.

After completing the operation of shooting the first row, the camera section 4 aligns the shooting direction to coordinates (1, 2) of the second row and shoots the target under the control of the CPU 56. Subsequently, it sequentially shifts the shooting direction horizontally. Then, it repeats the above operation in a similar manner until it gets to coordinates (i, j). When the camera section 4 completes the shooting operation, the server 53 stores image signals of the i×j unit images.

Note that the image signals of the unit images recorded in the server 53 are sequentially read out by the image compressing section 54 and the unit images are dimensionally reduced so as to match the size of the display screen of the display 6 as a whole. The dimensionally reduced unit images are displayed on the display 6 by way of the graphic controller 15. As all the i×j unit images recorded in the server 53 are displayed on the display 6, a single panoramic image of the entire target area is synthetically produced. The above described target shooting operation is repeated at regular intervals to make it possible to acquire the most updated image of the entire target area.

Figure 6:
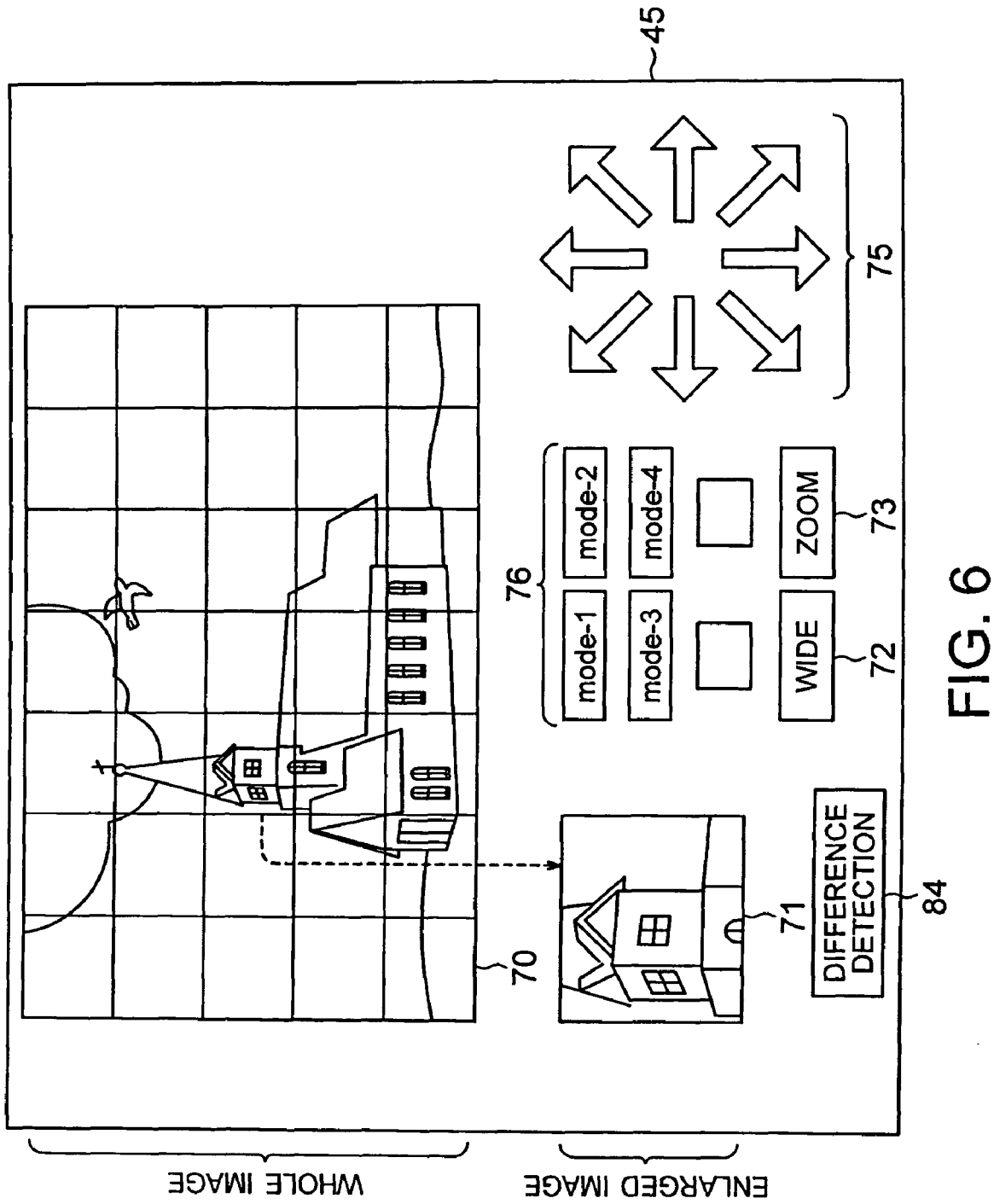
FIG. 6 is a schematic illustration of an image on a display, showing the elements of the image.

FIG. 6 is a schematic illustration of an image on the display 6 that includes an image of the entire target area obtained by synthetically combining a total of i×j unit images and displayed in a whole image display section 70 of the display 6. Note that the monitor 5 may have the whole image display section 70 display the boundaries of the unit images in the whole image or only the whole image seamlessly. Additionally, the monitor 5 may have the whole image display section 70 display a single whole image of the target area that is obtained by shooting the target area with a view angle good for picking up an image of the entire target area, as substituted for the single panoramic image of the entire target area.

The display screen 45 also has an enlarged image display section 71 for displaying an enlarged unit image. The enlarged image display section 71 may display the single unit image specified by the user out of the unit images of the whole image being displayed in the whole image display section 70 or a moving image obtained by shooting the target in the shooting direction of the specified single unit image. With this arrangement, the user can see the target as viewed in the shooting direction of the specified single unit image on a real time basis.

The user can specify a desired image region and a desired image position by way of the keyboard 59 and/or the mouse 60 to the whole image display section 70 and the enlarged image display section 71. The sections 70 and 71 may display a line of sight and/or a pointer for performing the above specifying operation in conjunction with the movement of the mouse 60 and the like.

The user can select any of various modes of operation of the camera unit 2 on the display screen 45 by inputting an instruction by means of the mouse 60. For example, the user can increase or decrease the magnification for the unit image being displayed on the enlarged image display section 71 and control and adjust the shooting direction of the camera section 4 horizontally and/or vertically.

As the difference detection button 84 being displayed on the display screen 45 is clicked by way of the mouse 60, the difference of luminance level between a unit image of the generated whole image and the corresponding unit image obtained before the specified unit image by shooting the target in the same shooting direction is detected at the difference detection time, which will be described in greater detail hereinafter.

The operation of detecting the difference is conducted by comparing the luminance level of a whole image formed by unit images recorded in the server 53 or the CPU 56 and that of a reference whole image. The whole image for which the difference is detected is referred to as comparative whole image and the whole image to be used as reference is referred to as reference whole image hereinafter.

Figure 7A:
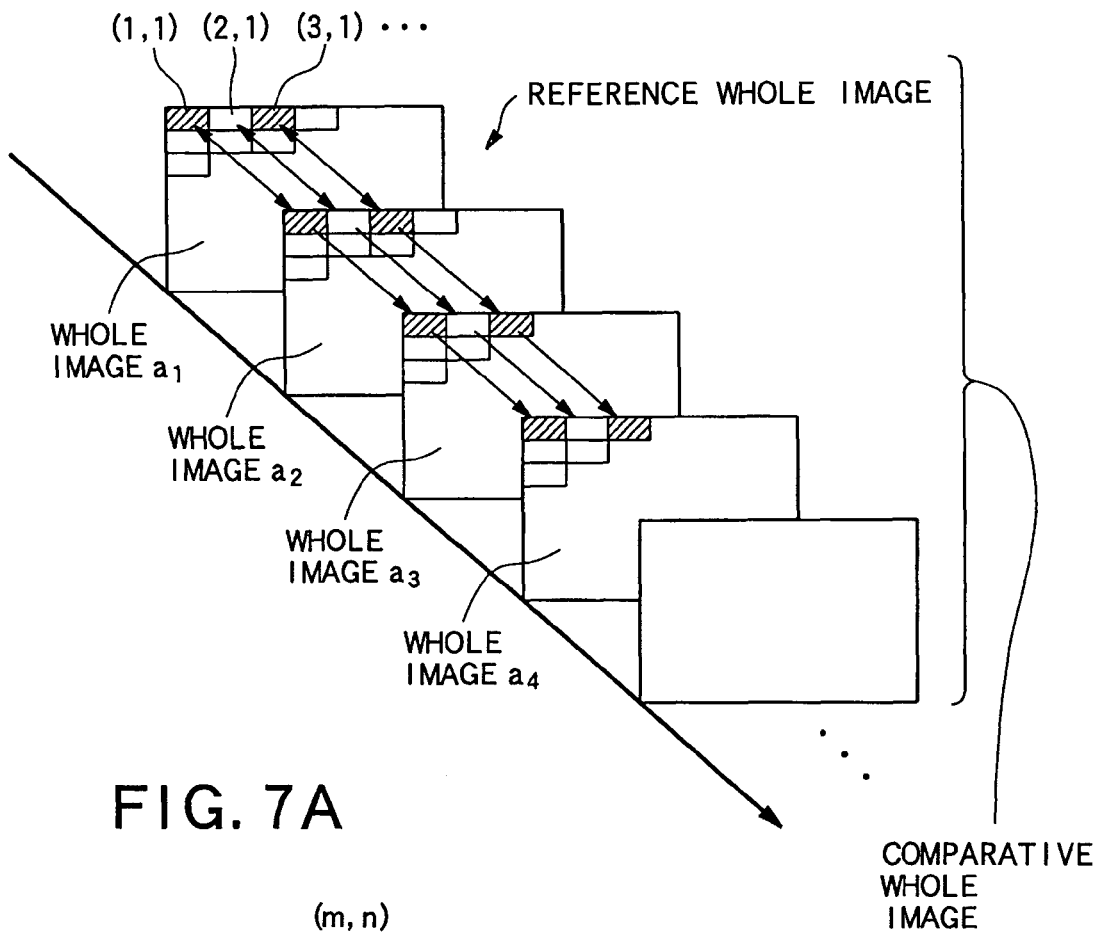
FIG. 7 is a schematic illustration of the operation of a monitoring system realized by applying the present invention.

Referring now to FIG. 7A, if the reference whole image is whole image a1 and the comparative whole image is whole image a2, the difference is detected for the whole image a2 by comparing the luminance level of each of the unit images of the whole image a2 with that of the corresponding unit image of the whole image a1. More specifically, the luminance level of each of the unit images located at respective coordinates (1, 1), (2, 1), (3, 1), ..., (M, N) of the whole image a2 is compared with that of the corresponding one of the whole image a2 that is obtained by shooting the target in the same shooting direction as shown in FIG. 7A. By doing so, the change in the luminance level of the comparative whole image relative to the reference whole image can be detected for each shooting direction.

Figure 7B:
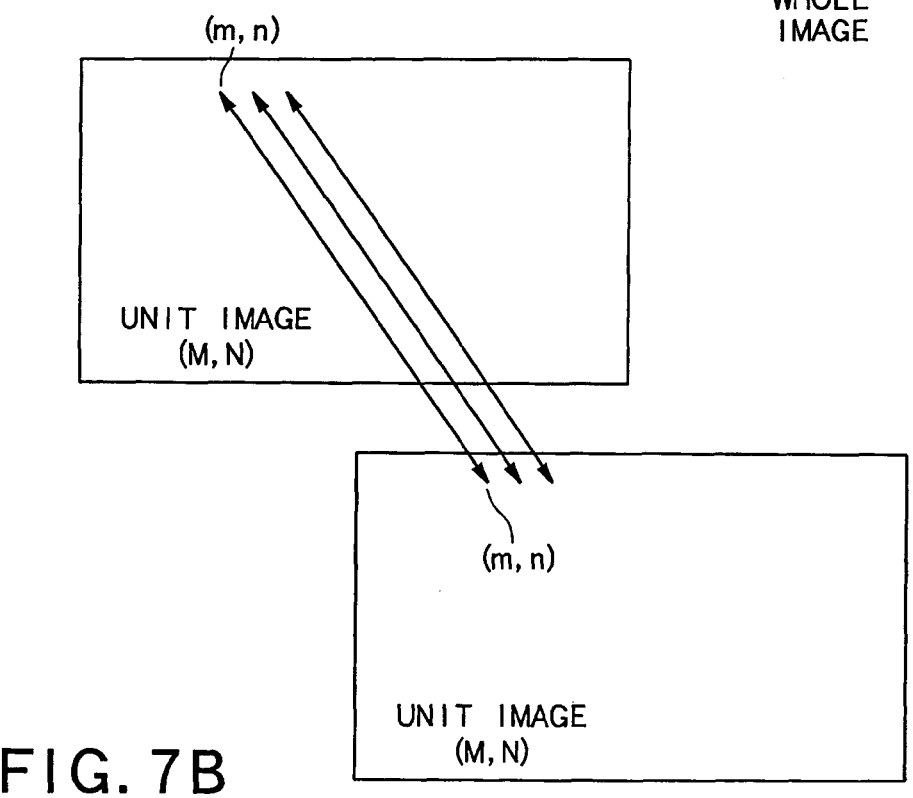

When the CPU 56 compares, for example, the luminance level of the unit image located at coordinates (M, N) of the comparative whole image (whole image a2) with that of the corresponding unit image of the reference whole image (whole image a1), it firstly reads out the two unit images from the server 53. Then, the CPU 56 compares the luminance level of each pixel (m, n) located at the same position of one of the unit images and that of the corresponding pixel of the other unit image as shown in FIG. 7B. The difference of between the two luminance levels of the two pixels (m, n) located at the same position may be determined when comparing the luminance levels. The CPU 56 can detect the difference of the luminance levels of the read out unit images by way of the differences of the luminance levels of the pixels of the unit images. Note that the comparison of luminance level between each pair of pixels may be conducted for all the pixels of unit image or for part of the pixels of unit image.

When another whole image a3 is supplied, the whole image a3 takes the role of comparative whole image and the whole image a2 takes the role of reference whole image and the two whole images are compared for the difference of luminance level in the same way. Similarly, when still another whole image a4 is supplied, the whole image a4 takes the role of comparative whole image and the whole image a3 takes the role of reference whole image and the two whole images are compared for the difference of luminance level in the same way. In this way, the whole images generated by way of the camera section 2 are sequentially specified as comparative whole images and the whole images generated immediately before are specified as reference whole images and each pair of whole images are compared for the difference of luminance level to make it possible to detect any movement in the most updated whole image instantaneously.

Figure 8:
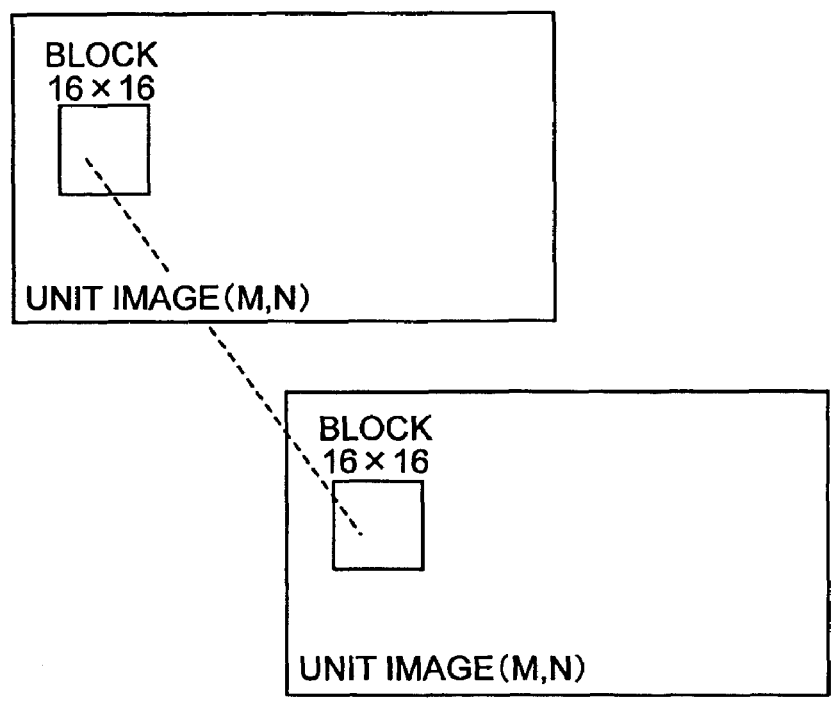
FIG. 8 is a schematic illustration of an operation of comparing unit images for luminance level, using an image compression technique.

When comparing the luminance levels of each pair of unit images, the CPU 56 may compare them not on a pixel by pixel basis but on an image compression unit by image compression unit basis as shown in FIG. 8.

Then, the CPU 56 operates to cut out macro-blocks of 16×16 pixels located respectively at the same positions from the unit images with coordinates (M, N) and compare the luminance levels of the cut out macro-blocks. Note that, the luminance level of each macro-block is expressed by the average of the luminance values of 16×16 pixels of the macro-block.

If the luminance levels are compared by using blocks having a size smaller than 8×8 pixels, noises are inevitably involved when the image signals that have been subjected to compression/coding according to the JPEG Standard are processed for elongation. As a result, it will not be possible to detect any difference of luminance accurately. In other words, the influence of noises can be reduced by comparing the luminance levels of blocks having a size not smaller than 8×8. Thus, in a monitor 5 according to the invention, it is possible to highly accurately detect the difference of luminance by comparing the luminance levels of sets of pixels that correspond to the image compression unit of DCT blocks or macro-blocks.

Figure 9:
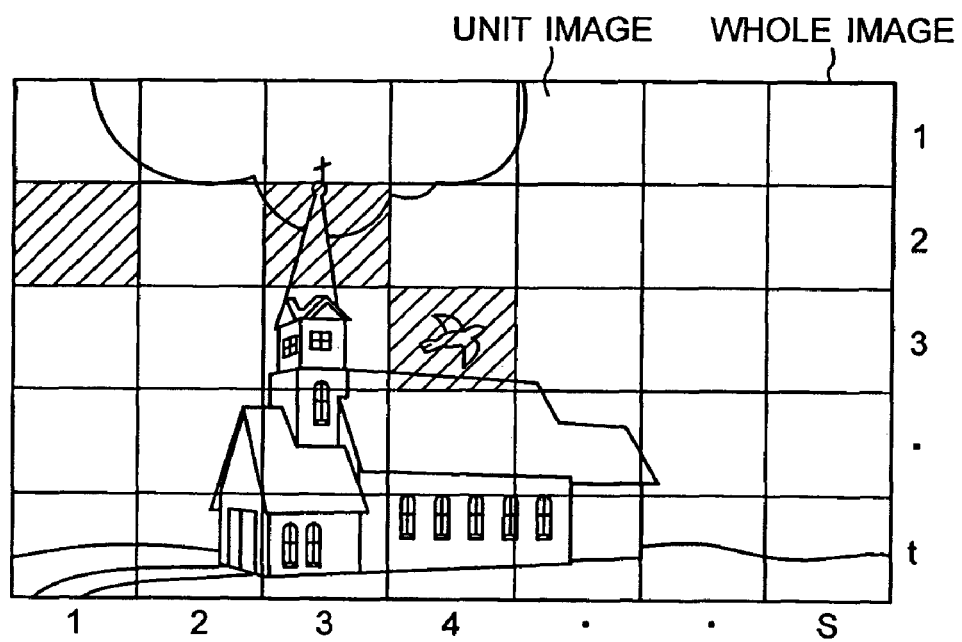
FIG. 9 is a schematic illustration of a panoramic image of a target area, showing unit images where a difference is detected in shade as a result of comparing the luminance levels on a unit image basis.

If, for instance, a difference of luminance level is detected at coordinates (1, 2), (3, 2) and (4, 3) as a result of comparing the luminance levels on a unit image basis, only the unit images showing a difference of luminance level are displayed with a colored frame to draw attention on the part of the user as shown in FIG. 9. In the display screen 45, in addition to displaying colored frames, it may be so arranged as to display each pair of unit images that shows a difference of luminance level in order to directly notify the user of occurrence of such a difference.

Figure 10:
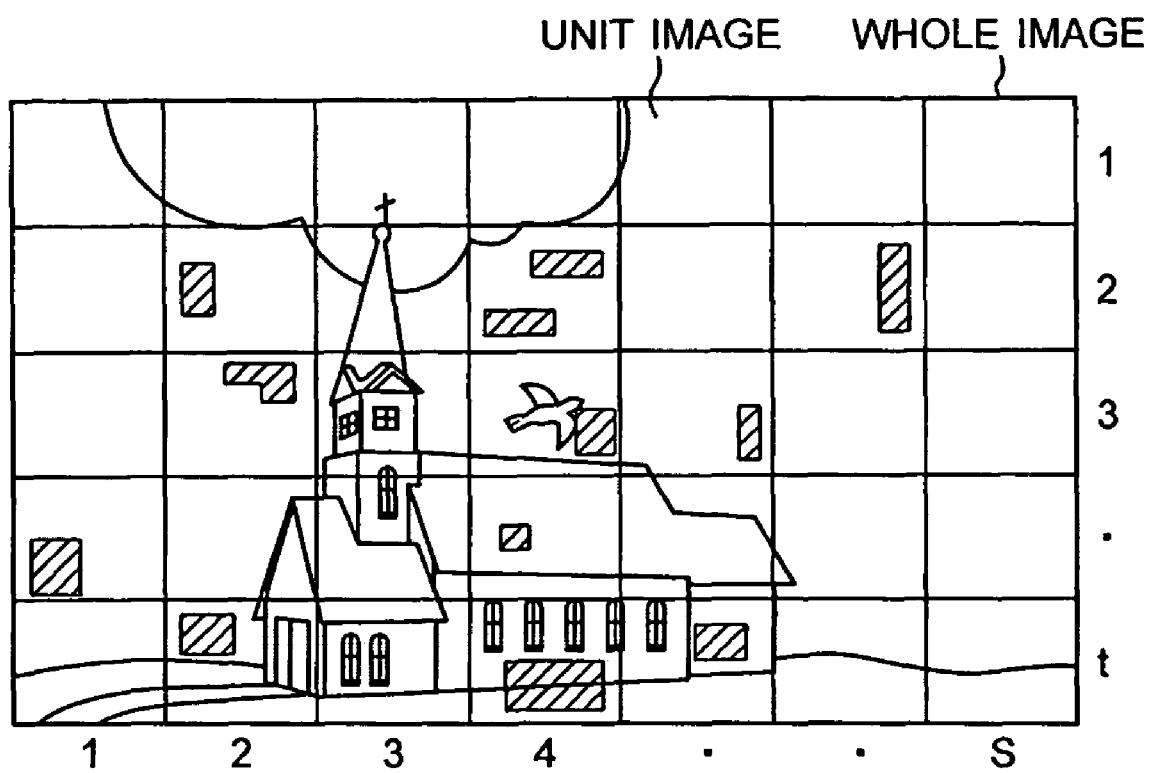
FIG. 10 is a schematic illustration of a panoramic image of a target area, showing the small image regions calling attention where a difference is detected as a result of comparing the luminance levels on a unit image basis.

The arrangement for displaying differences of luminance level in the monitor 5 is not limited to the instance of FIG. 9. It may alternatively be so arranged that, when differences are detected in the luminance level as a result of comparing on a pixel basis or on the basis of image compression unit of unit image, only the pixels or blocks that show differences are displayed with a color to draw attention on the part of the user as shown in FIG. 10. With this arrangement, it is possible to notify the user of any movement detected at a fine pitch.

A predefined threshold value may be used as criterion for determining if a difference is detected or not. While the CPU 56 detects the difference, if any, between the luminance levels of the unit images it reads out by means of the difference of luminance level of pixels or blocks, it may be so arranged as to say that a difference is detected when the detected difference exceeds a predefined threshold value. It is possible to detect movements in a target scene, focusing only on the movements of a desired object in the scene, by predefining an optimum threshold value depending on the target of shooting and the shooting environment.

The same threshold value may be predefined to all the unit images or different threshold values may be predefined respectively to all the unit images. Furthermore, if a threshold value is predefined for a unit image, different threshold values may be defined for the respective image regions that constitute the image as shown in FIG. 11.

Figure 11A:
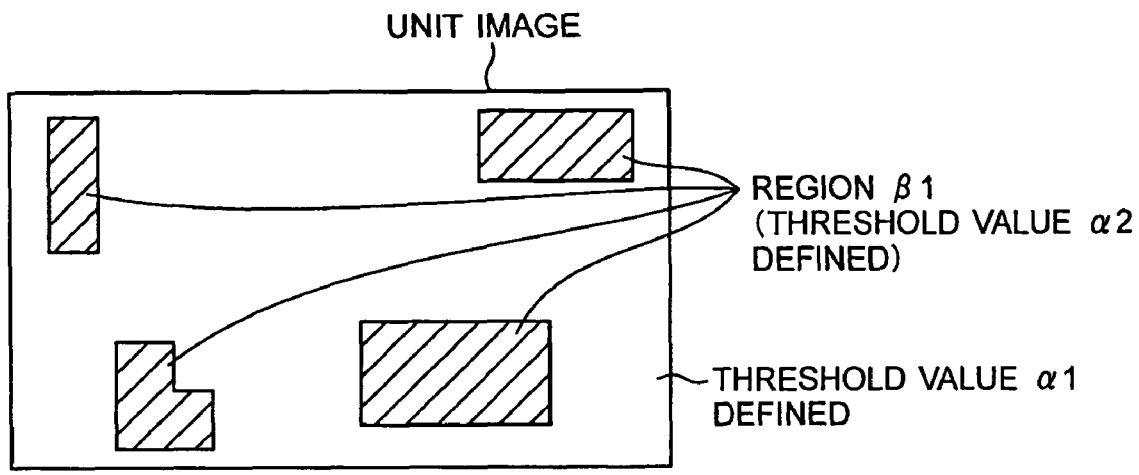
FIG. 11 is a schematic illustration of unit images for which a threshold value has already been defined and in which different threshold values are defined respectively for desired small image regions.

FIG. 11A illustrates an example where threshold value $\alpha 1$ is defined for a whole image and additionally another threshold value $\alpha 2$ is defined for desired shaded regions $\beta 1$ in the unit image. Note that the threshold value $\alpha 2$ is larger than the threshold value $\alpha 1$ in this instance. This means that, if a difference of luminance level that exceeds the threshold value $\alpha 1$ is detected in the regions $\beta 1$ for which the threshold value $\alpha 2$ is defined, it is determined that no difference is detected if the difference of luminance level does not exceeds the threshold value $\alpha 2$. In other words, no difference of luminance level is detected if the determined difference of luminance level does not exceed the threshold value $\alpha 2$ that is larger than the threshold value $\alpha 1$.

Thus, the regions $\beta 1$ for which the threshold value $\alpha 2$ is defined scarcely attract attention on the part of the user if a large value is selected for the threshold value $\alpha 2$. An image region in which movements are relatively frequently observed may draw user's attention excessively. However, such an image region can be made to draw user's attention less by defining the image region as region $\beta 1$. If the user wants to detect even a slight movement on the church building shown in the panoramic image of FIG. 10, the surroundings of the road leading to the entrance of the church that may frequently be crowded by people may by turn frequently draw attention on the part of the user because movements will be detected there frequently. However, if such an image region is defined as region $\beta 1$ and the threshold value $\alpha 2$ is assigned to the image region, the user may be relieved of a situation where the image region draws his or her attention frequently and excessively. Then, the user can monitor the image regions that are more important to him or her for detecting movements accurately and efficiently.

The threshold value $\alpha 2$ may be empirically determined depending on the luminance level of the one ore more than one image regions where a number of movements are detected per unit time. As for a place that is crowded by many walking people, the luminance level of a person may be identified in advance and a threshold value that does not allow persons to be detected may be selected for the threshold value $\alpha 2$ in order to avoid the place from unnecessarily attracting user's attention. Alternatively, the threshold value $\alpha 2$ may be replaced by a number of different threshold values. Then, the threshold values may be gradually differentiated according to the frequency of movement and the luminance levels of different objects in the scene.

Instead of selecting a large value for the threshold value $\alpha 2$ relative to the threshold value $\alpha 1$ as described above, the sensitivity of detecting any difference of luminance level in the regions $\beta 1$ may be reduced or the luminance level of the regions $\beta 1$ may be reduced.

For the purpose of the present invention, regions where the operation of detecting any difference of luminance level is not conducted may be defined in a unit image for which the threshold value $\alpha 1$ is defined.

Figure 11B:
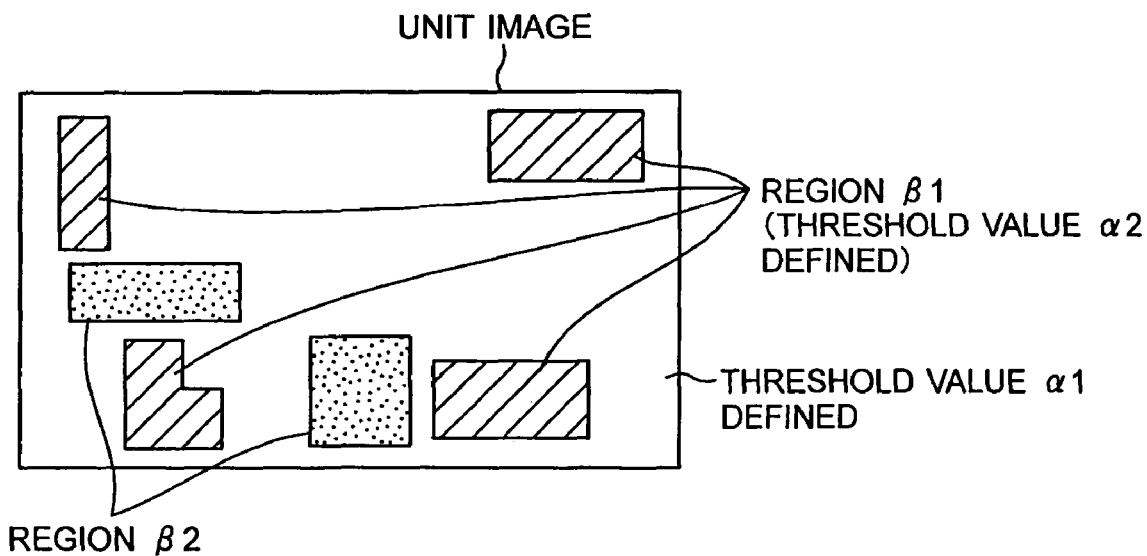

FIG. 11B shows a unit image for which the threshold value $\alpha 1$ is defined and in which shaded image regions $\beta 1$ and shaded image regions $\beta 2$ are defined. The shaded regions $\beta 2$ are image regions where the operation of detecting any difference of luminance level is not conducted.

Thus, any difference of luminance level is detected for each pixel or each block in the regions $\beta 2$ where the operation of detecting any difference of luminance level is not conducted. In other words, if some movement takes place and there arises a change in the luminance level of one or more than one pixel in any of the regions $\beta 2$, they do not draw any user's attention. If the threshold value $\alpha 1$ is defined for an entire unit image, only one or more than one regions $\beta 2$ may be defined in the unit image without defining any region $\beta 1$.

Thus, the monitor 5 of this embodiment can be so arranged that it does not detect any difference of luminance level in one or more than one regions of a unit image where movements take place actively. Therefore, it neither unnecessarily nor frequently draws user's attention in such image regions so that the user can monitor the scene highly efficiently and accurately.

The user defines the threshold value(s) for detecting the difference of luminance level in the above described monitoring system 1. However, the present invention is by no means limited thereto. It may alternatively be so arranged that a monitoring system realized by applying the present invention automatically discriminates one or more than one image regions where movements take place frequently and specifies those discriminated image regions as regions $\beta 1$ or regions $\beta 2$.

In such a case, the monitor 5 preliminarily shoots the same target area for a plurality of times before detecting any difference of luminance level. The view angle u and the shooting directions of the camera unit 2 may be defined in the above described manner. Thereafter, it detects any difference of luminance level between two unit images picked up from the same shooting direction.

Then, the monitor 5 specifies each of the image regions where a difference of luminance level is detected either as region $\beta 1$ or region $\beta 2$. If a difference of luminance level is detected or not is judged by comparing the difference of luminance level with a threshold value and the user can define an appropriate threshold value. When the monitor 5 specifies one or more than one image regions where a difference of luminance level is detected as so many regions $\beta 1$, it is possible to define an appropriate threshold value $\alpha 2$ on the basis of the magnitude of the detected difference of luminance level.

In other words, a monitoring system 1 realized by applying the present invention automatically defines a threshold value $\alpha 2$ for image regions containing one or more than one places where movements take place relatively frequently or does not conduct any operation of detecting a difference of luminance level when monitoring a desired target area. Then, as a result, it is possible to reduce the load applied to the user of discriminating image regions containing one or more than one places where movements take place relatively frequently by him- or herself by way of a displayed image and specifying them as regions $\beta 1$ or regions $\beta 2$. Additionally, the monitoring system 1 can automatically and accurately detect a slight difference of luminance level that the user can hardly visually discriminate by way of a displayed image and define an optimum threshold value $\alpha 2$.

Note that the number of times for which the monitor 5 preliminarily shoots the same target area and time intervals of shooting the target area may be appropriately selected depending on the shooting environment. For example, the monitor 5 may preliminarily shoot the same target area three times and determine the logical sum of the detected differences of luminance level. Then, the monitor automatically specifies the image regions expressed by the logical sum of the detected differences of luminance level as regions β1 or regions β2.

Additionally, a monitoring system 1 realized by applying the present invention may be so arranged as to store the regions β1 and the regions β2 specified in the above described manner by means of the following technique.

Figure 12:
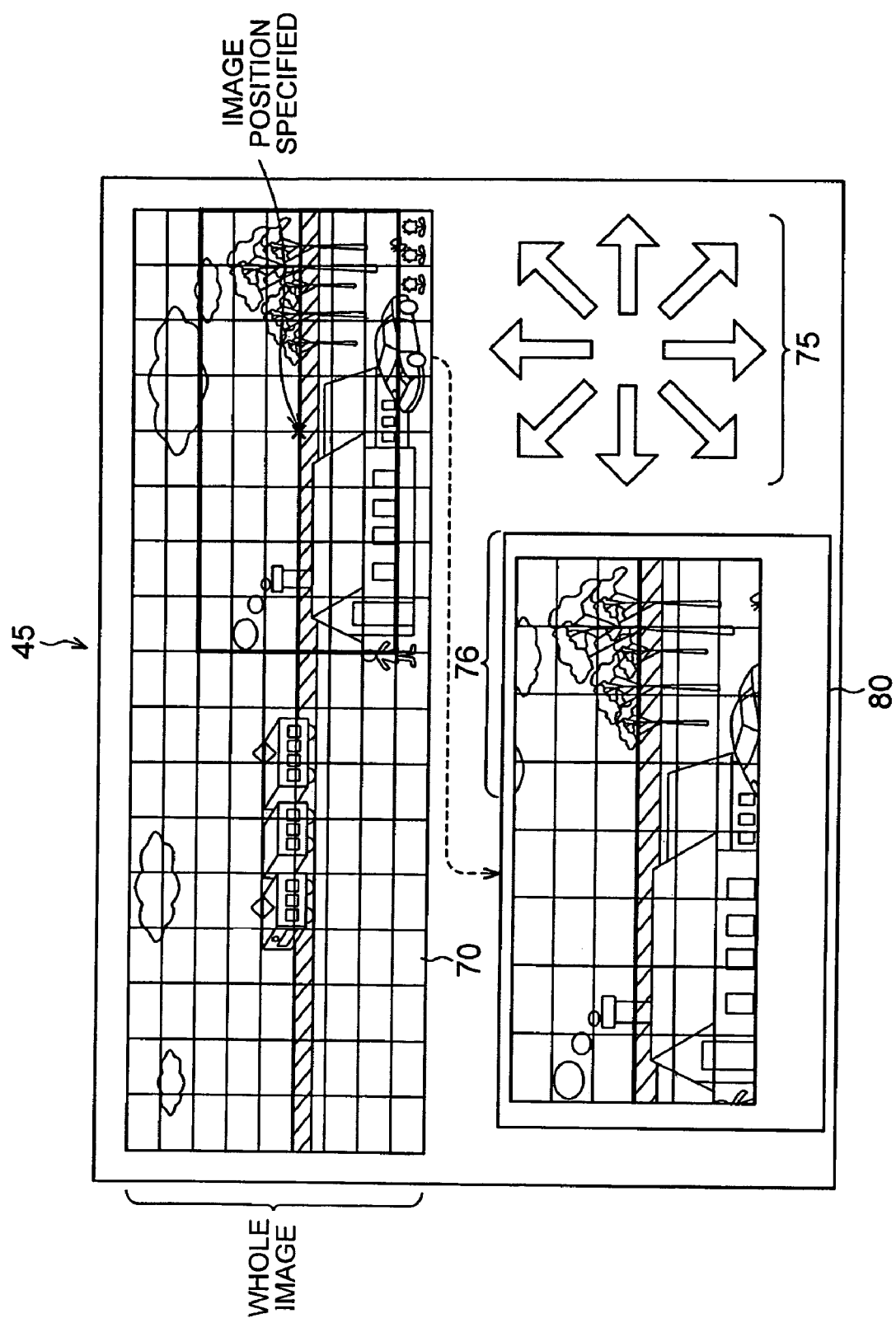
FIG. 12 is a schematic illustration of a panoramic image for which threshold values are defined and stored for specified desired small image regions.

Assume that an image position is specified by means of the mouse 60 in the whole image being displayed on the display screen 45 as illustrated in FIG. 12. Then, as the user points the image position by means of the mouse 60, there is displayed a mask defining window 80 including a set of unit images surrounding the image position (to be referred to as group of unit images hereinafter). Then, the user can specify desired image regions in the displayed group of unit images as regions β1 or regions β2. Or, the user can automatically specify desired image regions in the displayed group of unit images as regions β1 or regions β2 automatically for a plurality of preliminarily picked up images. Then, the user can visually recognize the detected differences of luminance level in the group of unit images by means of the mask defining window 80. Note that the specified regions β1, β2 and the specified threshold values α1, α2 can be correlated with the group of unit images and stored in the memory (not shown) arranged in the CPU 56.

The regions β1, β2 and the threshold values α1, α2 that are stored in the memory (not shown) will be read out according to the order of the user who may want to analyze them for the same group of unit images as a post-processing operation. More specifically, if the user wants to detect differences of luminance only in some of the groups of unit images that constitute the whole image, it is only necessary to read out the regions β1, β2 and the threshold values α1, α2 of the related regions stored in the memory (not shown). Therefore, the workload of defining regions and threshold values for such an analysis can be reduced.

A plurality of image positions may be specified in the whole image. Then, it is possible to define the regions β1, β2 and the threshold values α1, α2 for each group of unit images surrounding each of the specified image position and store them in the memory, correlating them with the group of unit images. With this arrangement, it is possible to advantageously detect differences of luminance level for each group of unit images of the whole image, while reducing the workload on the part of the user.

It may be so arranged that the user can select an appropriate number of unit images for each group of unit images surrounding an image position.

The monitoring system 1 may be so arranged that the unit images of each selected group of unit images are newly picked up with the same view angle u. With such an arrangement, the CPU 56 transmits a drive signal to the tilt section 3*a* and the pan section 3*b* so as to align the shooting angle of the camera section 4 with the selected group of unit images for the image pickup operation.

Then, if the user wants to detect differences of luminance only in some of the groups of unit images that constitute the whole image, the workload of the image pickup operation is minimized to remarkably improve the processing speed. Then, it is possible to accurately detect any movement at a fine pitch in the minimally necessary unit images.

The monitor 5 may be so arranged that it compares the luminance levels of unit images according to the R, G, B primary color signals of the unit images.

FIG. 13A is a schematic illustration of a technique of defining a color level and a difference detection level for the primary color of R (red). In FIG. 13A, the vertical axis represents the difference of luminance level (brightness) as computed for each pixel of the unit images to be compared. FIG. 13B shows the maximum value of the differences shown in FIG. 13A in terms of the horizontal direction, while FIG. 13C shows the maximum value of the differences shown in FIG. 13A in terms of the vertical direction.

Referring to FIG. 13, the threshold value L1 and the color level L2 can be freely defined by the user by means of the keyboard 59 and the mouse 60. A difference is detected when the computed difference of luminance level of the primary color(R) exceeds the threshold value L1. The color level L2 is used to define the gain of a computed difference in order to improve the S/N ratio. For example, as a difference value is amplified to the color level L2, the remaining differences are also amplified. It is possible to highly accurately detect differences by defining a desired threshold value L1 for each amplified difference value. More specifically, the user can freely define the color level L2 corresponding to the level of difference value that the user wants to use for detecting differences and also the extent of change in the level relative to the color level L2 to be used as criterion for detecting differences by defining the threshold value L1 relative to the color level L2. Note that L1 and L2 can be defined for the remaining primary colors (G and B).

Note that the threshold value L1 and the color level L2 may be differentiated among the primary colors of R, G and B and/or among the unit images of the whole image.

Thus, when the difference of luminance level computed for each primary color for the unit images to be compared exceeds the threshold value L1 of at least the related one of the three primary colors, the monitoring system 1 can determine that a difference is detected for the unit images. In other words, the monitoring system 1 can detect any such difference for each of the primary colors of R, G and B. Then, it is possible to highly accurately detect any fine change that cannot be visually detected in the whole image actually displayed on the display screen 45.

It is possible to effectively prevent excessively drawing user's attention by optimally defining the threshold values α2 respective for the defined threshold values L1.

Note that the threshold value α2 may be differentiated among the primary colors of R, G and B. Then, it is possible to reduce the frequency of drawing user's attention to apparent differences generated by R, G, B signals that cannot be visually detected.

Similarly, the monitoring system 1 may be so arranged that the luminance levels of the unit images to be compared are actually compared according to the luminance signal (Y signal) and the color difference signals (U, V signals). With such an arrangement, it is possible to extract information on the difference that can be detected on the basis of the luminance signal or the color difference signals, although it cannot be detected on the basis of the primary color signals in a manner as described above, to attract user's attention.

In the above-described monitoring system 1 realized by applying the present invention, it is also possible to select the size of the object for which any difference of luminance level can be detected.

Figure 14A:
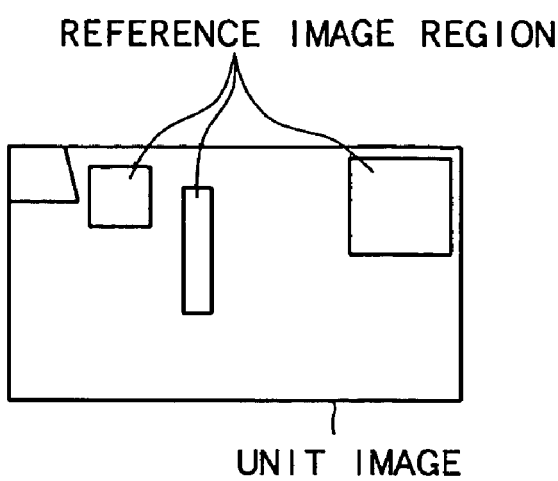
FIG. 14 is a schematic illustration of a technique of selecting the size of the object for which difference is detected.

Referring to FIG. 14A, the user can define a desired reference image region in each unit image by means of the keyboard 59 and the mouse 60. Either a single type of reference image region or a plurality of different type of reference image regions may be defined in each unit image. Reference image regions may be defined with different sizes for the primary colors.

Figure 14B:
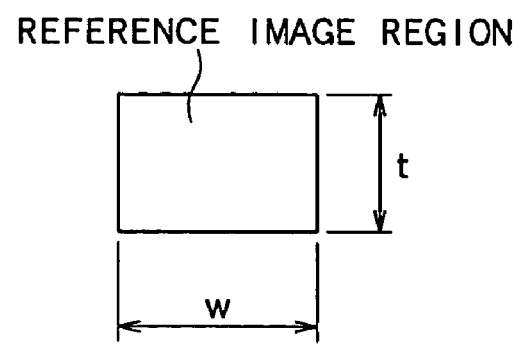

Assume that the user defines a reference image region having a horizontal length (width) of w and a vertical length (height) of t as shown in FIG. 14B. The CPU 56 detects a region showing a difference exceeding the threshold value L1 in the unit image where the reference image region is defined. Then, the CPU 56 compares the size of the detected region and that of the reference image region.

Figure 15:
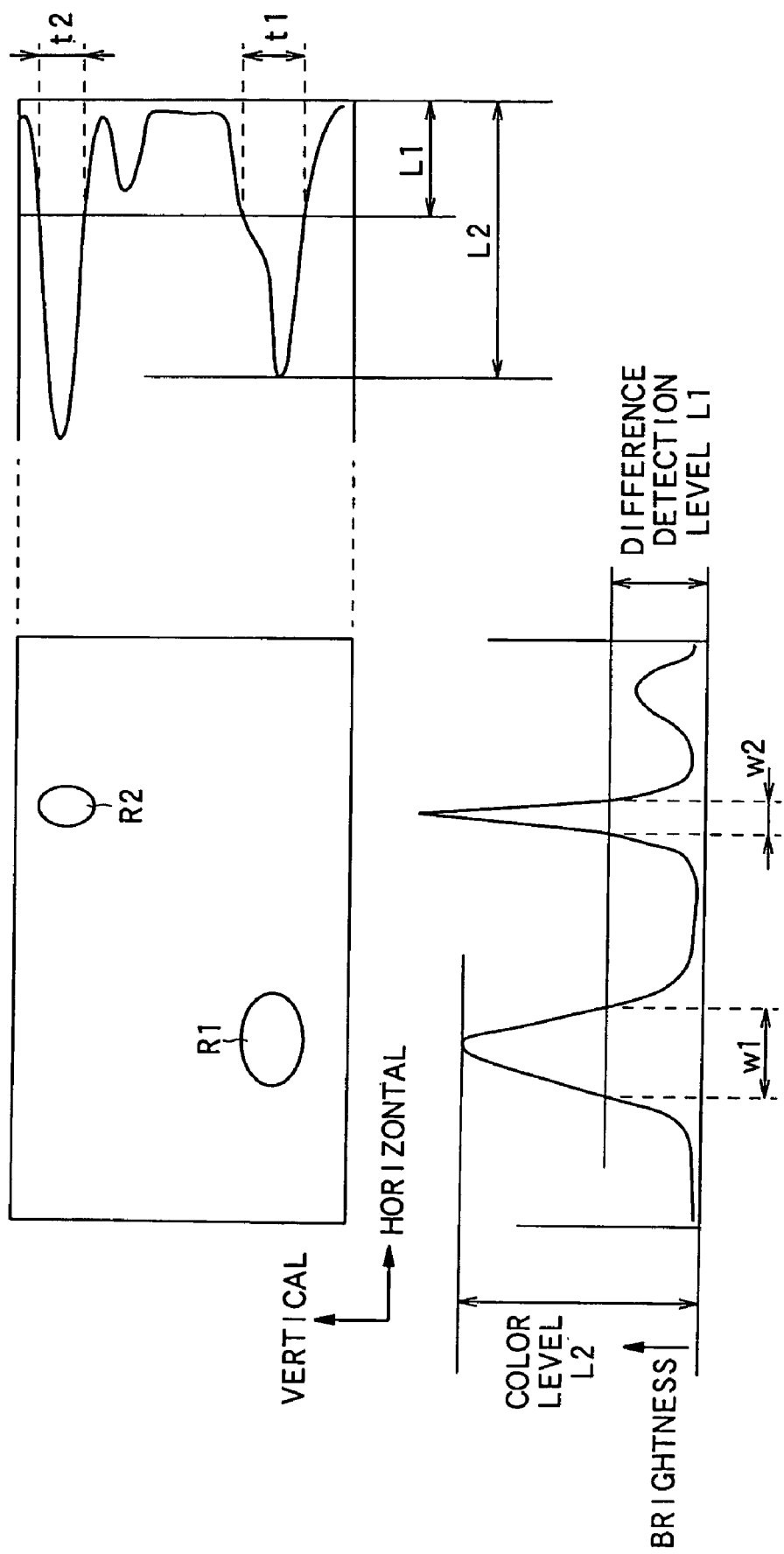
FIG. 15 is a schematic illustration of a technique of comparing the size of a detected small region and that of a reference image region.

If the detected region showing a difference exceeding the threshold value L1 is region R1 having a horizontal length (width) of w1 and a vertical length (height) of t1 as shown in FIG. 15, the CPU 56 compares the horizontal length (width) w1 and the vertical length (height) t1 respectively with the horizontal length (width) w and the vertical length (height) t of the reference image region. If the size of the detected region R1 exceeds that of the reference image region both horizontally and vertically, the CPU 56 determines that a difference is detected. If the size of the detected region R1 falls under that of the reference image region either horizontally or vertically, the CPU 56 determines that no difference is detected.

Similarly, if the CPU 56 detects a region showing a difference exceeding the threshold value L1, which is region R2 having a horizontal length (width) of w2 and a vertical length (height) of t2, the CPU 56 compares the horizontal length (width) w2 and the vertical length (height) t2 respectively with the horizontal length (width) w and the vertical length (height) t of the reference image region to determine if a difference is detected or not.

Thus, the monitoring system 1 realized by applying the present invention can select a region to be used for detecting a difference according to the reference image region defined by the user. Particularly, no difference will be detected from a very small region detected by the CPU 56 if the size of the reference image region is finely regulated. Then, as a result, the unit image containing such a region is no longer displayed with a colored frame to prevent excessively drawing user's attention.

An operation of selecting a particular object is selected out of the target area and detecting any difference of luminance level in it can be realized by defining an appropriate size for a reference image region as a function of the size of the region of the selected object. A whole image obtained by shooting the target area, sequentially shifting the shooting direction, normally contains various objects. However, any difference of luminance level can be detected from each of such objects by means of a single monitoring system by defining reference image regions whose sizes may differ from unit image to unit image.

A pair of identical objects may be displayed with different sizes in a unit image depending on the distance from the camera section 4. For example, if there are two automobiles of the same type parking on different roads, one parking on a road located remote from the camera section 4 and the other parking on another road located close to the camera section 4, the latter is displayed larger than the former in the unit images. However, any difference of luminance level can be detected accurately from each of the automobiles of the same type regardless of the distance from the camera section 4 when the sizes of the defined reference image regions are altered between the unit image containing the road located remote from the camera section 4 and the unit image containing the road located close to the camera section 4.

Figure 16:
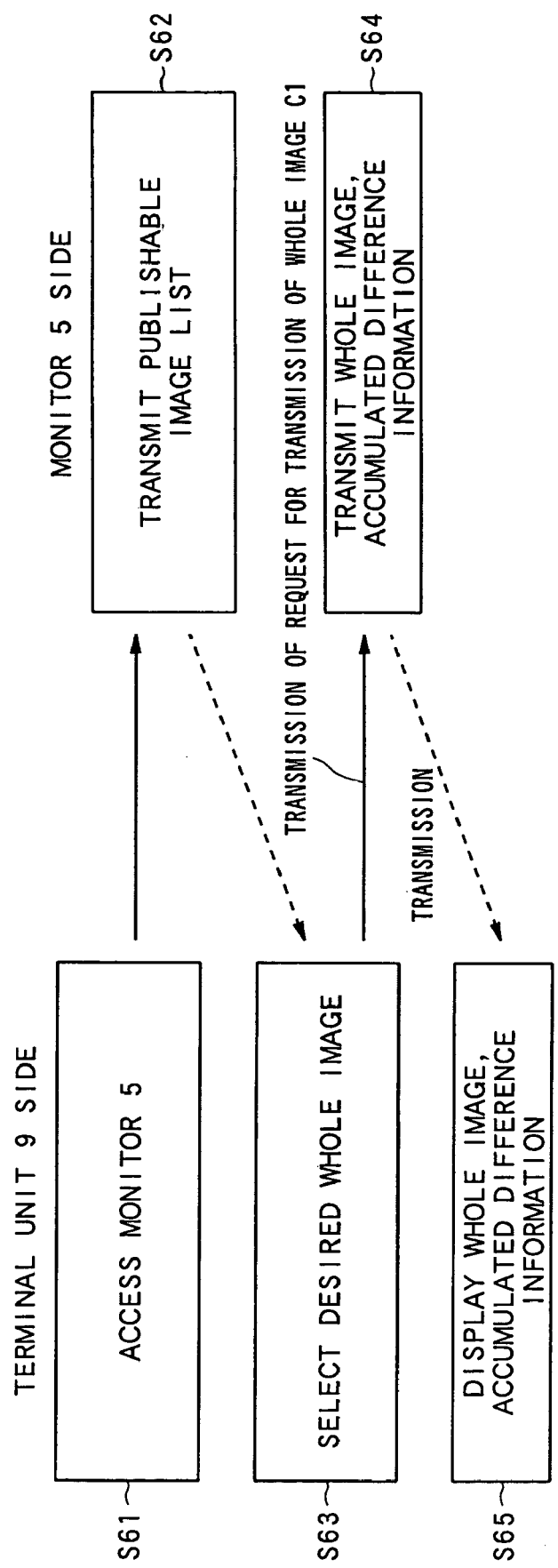
FIG. 16 is a flow chart illustrating the sequence of operation of providing information on the detected difference to a user operating a terminal unit.

The monitoring system 1 realized by applying the present invention can provide information on the detected differences to the user who is operating at the terminal unit 9 by following the flow chart of the sequence of operation illustrated in FIG. 16.

Firstly, in Step S61, the user operating at the terminal unit 9 accesses the monitor 5 that is connected to the network 8.

Then, in Step S62, the monitor 5 prepares a publishable image list that can be disclosed to the user out of the whole images recorded in its own server 53 and transmits it to the terminal unit 9. The publishable image list contains the file names and the file sizes of the whole image and reduced whole images may be pasted to it. The publishable image list is displayed on the terminal display 10 by way of the network 8 and the terminal unit 9.

Then, in Step S63, the user selects the whole image he or she wants out of the publishable image list. The terminal unit 9 transmits a whole image transmission request C1 to the monitor 5 in response to the operation of selecting the whole image on the part of the user.

In Step S64, upon receiving the whole image transmission request C1, the monitor 5 reads out the whole image selected by the user and transmits it to the terminal unit 9. The transmitted whole image is then displayed on the terminal display 10 by way of the network 8 and the terminal unit 9.

Then, in Step S65, the user can easily identify the image regions in the whole image being displayed on the terminal display 10 and drawing his or her attention.

The monitoring system 1 accumulates the image signals of the whole images picked up in the past and thus can analyze the differences that occurred in the past as a post-processing operation. When analyzing the situations where the differences occurred and the causes of the differences, the CPU 56 compares the luminance levels of different unit images and draws user's attention to each unit image where a difference arises in luminance level to reduce the workload on the part of the user.

What is claimed is:

1. A monitor for monitoring a generated panoramic image, the monitor comprising:

defining means for predefining a plurality of regions with a threshold value greater than a predetermined threshold value, wherein different threshold values are defined for each of the plurality of regions that constitute the generated panoramic image;

comparing means for sequentially detecting a difference of luminance level between each image region forming the generated panoramic image and a corresponding image region of another generated panoramic image taken prior to a first image along a same shooting direction and comparing the detected difference of luminance level with the predetermined threshold value for each image region, and exempting a plurality of the plurality of regions from comparison according to the defined threshold values to minimize workload and reduce frequency of drawing user's attention to apparent differences generated by R, G, B signals that cannot be visually detected;

shifting means for shifting the shooting direction sequentially in a horizontal and vertical direction from a coordinate (1, 1) to (i, j) to shoot an entire area with a set view angle u to obtain the plurality of regions;

compression means for compressing and coding the image signal;

adding means for adding position information and corresponding meta-data to the image signal; and display control means for causing predetermined information to be displayed on a display screen along with the generated panoramic image according to the result of the comparison by the comparing means.

2. The monitor according to claim 1, further comprising: shooting means for shooting a target area and sequentially shifting the shooting direction thereof.

3. The monitor according to claim 1, wherein the comparing means compares the difference of luminance level on the basis of an image compression unit.

4. The monitor according to claim 1, wherein the comparing means compares the difference of luminance level for each primary color signal or for each luminance signal and each color difference signal.

5. A method of monitoring a generated panoramic image, the method comprising:

a defining step defining a plurality of regions with a threshold value greater than a predetermined threshold value, wherein different threshold values are defined for each of the plurality of regions that constitute the generated panoramic image;

a comparing step of sequentially detecting a difference of luminance level between each image region forming the generated panoramic image and a corresponding image region of another generated panoramic image taken prior to a first image along a same shooting direction and comparing the detected difference of luminance level with the predetermined threshold value for each image region, and exempting a plurality of the plurality of regions from comparison according to the defined threshold values to minimize workload and reduce frequency of drawing user's attention to apparent differences generated by R, G, B signals that cannot be visually detected;

a shifting step for shifting the shooting direction sequentially in a horizontal and vertical direction from a coordinate (1, 1) to (i, j) to shoot an entire area with a set view angle u to obtain the plurality of regions;

a compression step for compressing and coding the image signal;

an adding step for adding position information and corresponding meta-data to the image signal; and a display step of causing predetermined information to be displayed on a display screen along with the generated panoramic image according to the result of the comparison in the comparing step.

6. The method according to claim 5, wherein the difference of luminance level is compared on the basis of image compression unit in the comparing step.

7. The method according to claim 5, wherein the difference of luminance level is compared for each primary color signal or for each luminance signal and each color difference signal in the comparing step.

8. A non-transitory computer-readable medium for storing a computer program for monitoring a generated panoramic image, the program comprising:

a defining step to define a plurality of regions with a threshold value greater than a predetermined threshold value, wherein different threshold values are defined for each of the plurality of regions that constitute the generated panoramic image;

a comparing step of sequentially detecting a difference of luminance level between each image region forming the generated panoramic image and a corresponding image region of another generated panoramic image taken prior to a first image along a same shooting direction and comparing the detected difference of luminance level with the predetermined threshold value for each image region, and exempting a plurality of the plurality of regions from comparison according to the defined threshold values to minimize workload and reduce frequency of drawing user's attention to apparent differences generated by R, G, B signals that cannot be visually detected;

a shifting step for shifting the shooting direction sequentially in a horizontal and vertical direction from a coordinate (1, 1) to (i, j) to shoot an entire area with a set view angle u to obtain the plurality of regions;

a compression step for compressing and coding the image signal;

an adding step for adding position information and corresponding meta-data to the image signal; and a display step of causing predetermined information to be displayed on a display screen along with the generated panoramic image according to the result of the comparison in the comparing step.

9. A non-transitory recording medium storing a computer-readable program for monitoring a generated panoramic image, the program comprising:

a defining step defining a plurality of regions with a threshold value greater than a predetermined threshold value, wherein different threshold values are defined for each of the plurality of regions that constitute the generated panoramic image;

a comparing step of sequentially detecting a difference of luminance level between each image region forming the generated panoramic image and a corresponding image region of another generated panoramic image taken prior to a first image along a same shooting direction and comparing the detected difference of luminance level with the predetermined threshold value for each image region, and exempting a plurality of the plurality of regions from comparison according to the defined threshold values to minimize workload and reduce frequency of drawing user's attention to apparent differences generated by R, G, B signals that cannot be visually detected;

a shifting step for shifting the shooting direction sequentially in a horizontal and vertical direction from a coordinate (1, 1) to (i, j) to shoot an entire area with a set view angle u to obtain the plurality of regions;

a compression step for compressing and coding the image signal;

an adding step for adding position information and corresponding meta-data to the image signal; and a display step of causing predetermined information to be displayed on a display screen along with the generated panoramic image according to the result of the comparison in the comparing step.

10. The monitor according to claim 1, wherein defining means automatically defines the plurality of regions with a threshold value greater than the predetermined threshold value and the one or more regions exempt from comparison.

11. The monitor according to claim 1, further comprising:
- a memory for storing the predefined regions and threshold values thereof.

12. The monitor according to claim 1, wherein the defining means predefines on a unit image basis.

13. The monitor according to claim 1, wherein the defining means predefines on groups of unit images basis.

14. The monitor according to claim 1, wherein the defining means predefines on user selected groups of unit images basis.

15. The monitor according to claim 1, wherein the defining means predefines sizes of an object for which any difference of luminance level can be detected.

* * * * *